United States Patent
Kawagishi et al.

(10) Patent No.: US 8,737,352 B2
(45) Date of Patent: May 27, 2014

(54) COMMUNICATION SYSTEM, MOBILE TERMINAL AND COMMUNICATION METHOD

(75) Inventors: Takeshi Kawagishi, Kawasaki (JP); Hiroshi Sasaki, Kawasaki (JP); Jun Sakurai, Kawasaki (JP); Tsutomu Itou, Kawasaki (JP); Kanji Hozumi, Kawasaki (JP); Tatsuya Urushiyama, Kawasaki (JP); Masahiro Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 228 days.

(21) Appl. No.: 12/790,984

(22) Filed: May 31, 2010

(65) Prior Publication Data
US 2010/0316020 A1 Dec. 16, 2010

(30) Foreign Application Priority Data
Jun. 11, 2009 (JP) .................. 2009-140373

(51) Int. Cl.
*H04W 4/00* (2009.01)

(52) U.S. Cl.
USPC .......................................... 370/331; 370/338

(58) Field of Classification Search
USPC ...................... 370/331, 350; 455/436, 442
See application file for complete search history.

(56) References Cited

U.S. PATENT DOCUMENTS

| | | | |
|---|---|---|---|
| 5,649,000 A * | 7/1997 | Lee et al. | 455/436 |
| 6,667,963 B1 * | 12/2003 | Rantalainen et al. | 370/337 |
| 6,836,506 B2 * | 12/2004 | Anderson | 375/145 |
| 6,845,238 B1 * | 1/2005 | Muller | 455/436 |
| 7,359,355 B2 * | 4/2008 | Faerber | 370/332 |
| 7,450,944 B2 * | 11/2008 | Leelahakriengkrai et al. | 455/436 |
| 7,466,683 B2 * | 12/2008 | Bassompierre et al. | 370/350 |
| 7,561,645 B2 * | 7/2009 | Smith et al. | 375/347 |
| 8,129,533 B2 * | 3/2012 | Nishimoto | 546/159 |
| 8,380,240 B2 * | 2/2013 | Muharemovic et al. | 455/524 |
| 8,406,795 B2 * | 3/2013 | Lane et al. | 455/502 |
| 2003/0013450 A1 * | 1/2003 | Wang et al. | 455/442 |
| 2006/0019664 A1 * | 1/2006 | Nelakanti et al. | 455/436 |
| 2006/0111141 A1 * | 5/2006 | Smith et al. | 455/553.1 |
| 2010/0093389 A1 * | 4/2010 | Asokan et al. | 455/552.1 |
| 2011/0317667 A1 * | 12/2011 | Li et al. | 370/331 |

FOREIGN PATENT DOCUMENTS

| | | |
|---|---|---|
| JP | 2000-078640 A | 3/2000 |
| JP | 2003-333660 A | 11/2003 |
| JP | 2007-267263 A | 10/2007 |

* cited by examiner

Primary Examiner — Warner Wong
(74) Attorney, Agent, or Firm — Fujitsu Patent Center

(57) ABSTRACT

A communication system includes a first base station for communicating complying with a first communication protocol, a second base station for communicating by using radio frames complying with a second communication protocol and transmitting synchronization signals complying with the first communication protocol, the synchronization signals synchronizing the transmitted radio frames, and a mobile terminal for communicating according to the process includes: receiving the synchronization signals from the second base station while communicating with the first base station, estimating transmitting timing of the radio frames including symbols on the basis of the received synchronization signals, measuring a receiving signal strength of the symbol on the basis of the estimated timing, and controlling a handover from the first base station to the second base station on the basis of the measurement result by the measurement of the receiving signal strength of the symbol.

11 Claims, 6 Drawing Sheets

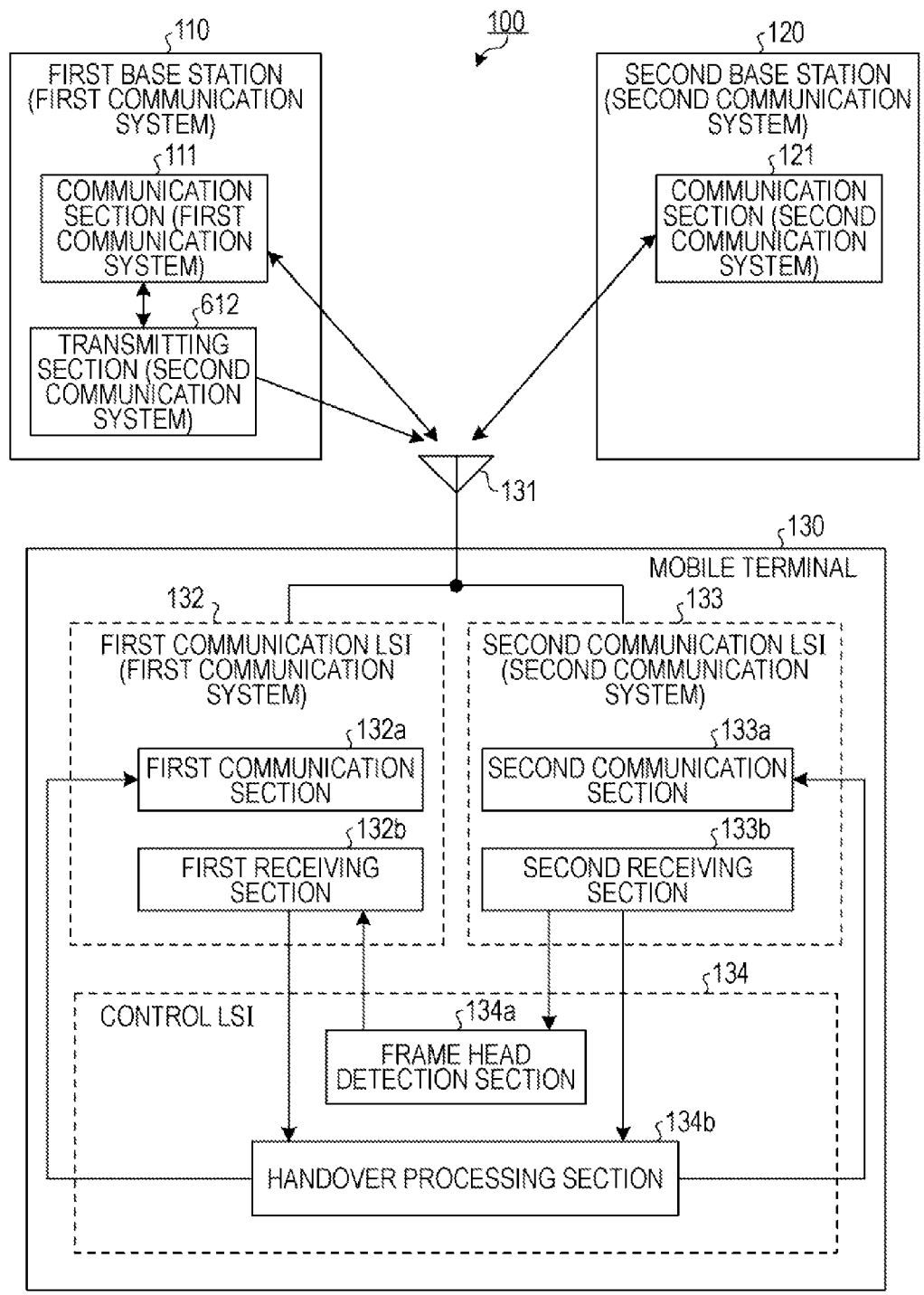

COMMUNICATION SYSTEM, MOBILE TERMINAL AND COMMUNICATION METHOD

CROSS-REFERENCE TO RELATED APPLICATION

This application is based upon and claims the benefit of priority of the prior Japanese Patent Application No. 2009-140373, filed on Jun. 11, 2009, the entire contents of which are incorporated herein by reference.

FIELD

A certain aspect of the embodiments discussed herein relates to a mobile terminal adapted for handovers, a communication system and a communication method.

BACKGROUND

Mobile terminals, such as mobile phones, communicate in various systems (Radio Access Technology: RAT) in order to, for example, promote efficient use of radio waves and increase communication speed. Examples of communication systems in practical use for mobile phones include Global System for Mobile (GSM), Wideband Code Division Multiple Access (W-CDMA) and Super 3G (Long Term Evolution: LTE).

Upon introduction of a new communication system in an area in which another communication system is operating, it is desirable that both communication systems can operate together. An exemplary system therefor is a RAT handover process by which different communication systems are switched over in real time to provide high quality and high speed wireless communication in various communication environments (see Japanese Laid-Open Patent Publication No. 2003-333660). In the RAT handover process, a communication level is measured for each communication system before a handover is made between base stations operating under different communication systems on the basis of the measured level.

Mobile terminals, such as mobile phones, which are required to achieve high performance and reduced size at the same time, are often provided with a single antenna common to a plurality of communication systems. In such a configuration, gap sections in which no data communication is made are interposed between radio frames transmitted under a communication system in operation (hereinafter, referred to as a "first communication system"). At the same time, quality of communication under a communication system not in operation (hereinafter, referred to as a "second communication system") is assessed in the gap sections (see Japanese Laid-Open Patent Publication No. 2000-078640).

The related art technology described above, however, has the following deficiency. In the event that the length of the gap sections in the radio frames of the first communication system is insufficient, quality of communication under the second communication system cannot be assessed appropriately and thus a handover to another communication system cannot be made accurately. In most cases, the gap sections of the first communication system are dedicated to assessment of quality of communication at different frequencies under the first communication system. Thus, the gap sections are not always long enough to provide appropriate assessment of quality of communication under the second communication system.

When the gap sections of the first communication system are insufficient in length, it is difficult to determine head positions of radio frames of the second communication system in the gap sections of the first communication system. With this configuration, symbols for measurement included in the radio frames of the second communication system cannot be measured accurately. In the event that the radio frames of the second communication system are longer than the gap sections in the radio frames of the first communication system, the symbol for measurement included in the radio frames of the second communication system may be out of the gap sections in the radio frames of the first communication system. Thus, quality of communication in the second communication system cannot be assessed appropriately.

SUMMARY

According to an aspect of an embodiment, a communication system including: a first base station for communicating on the basis of a first communication protocol; a second base station for communicating by using radio frames on the basis of a second communication protocol and transmitting synchronization signals complying with the first communication protocol, the synchronization signals synchronizing the transmitted radio frames; and a mobile terminal for communicating on the basis of the first communication protocol and the second communication protocol according to the process including: receiving the synchronization signals from the second base station while communicating with the first base station complying with the first communicating protocol; estimating transmitting timing of the radio frames including symbols on the basis of the received synchronization signals; measuring a receiving signal strength of the symbol transmitted from the second base station on the basis of the estimated timing; and controlling a handover from the first base station to the second base station on the basis of the measurement result by the measurement of the receiving signal strength of the symbol.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a block diagram of a modified embodiment of the communication system illustrated in FIG. 1.

DESCRIPTION OF EMBODIMENTS

Referring now to the accompanying drawings, embodiments of a mobile terminal, a communication system and a communication method will be described in detail. In the mobile terminal, the communication system and the communication method, head positions of radio frames of a second communication system are detected on the basis of synchronization signals transmitted under a first communication system in order for a handover from a first base station to a second base station. The synchronization signals are synchronized with radio frames of the second communication system. With this configuration, quality of communication between the first and second base stations can be assessed appropriately and thus a handover to another communication system can be made accurately.

Configuration of Communication System

Figure 1:
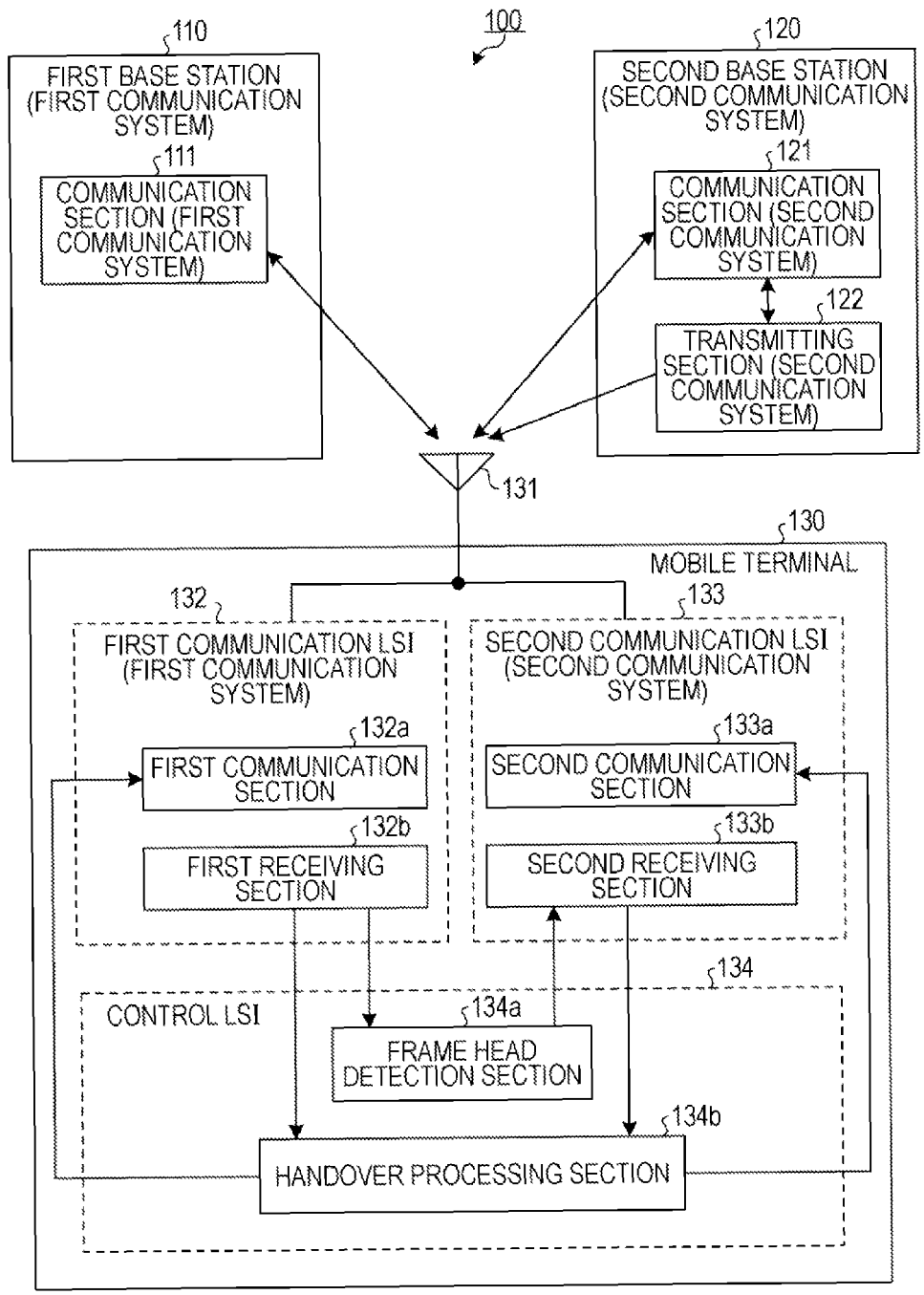
FIG. 1 is a block diagram illustrating a configuration of a communication system according to an embodiment.

FIG. 1 is a block diagram illustrating a configuration of a communication system according to an embodiment. As illustrated in FIG. 1, a communication system 100 according to the present embodiment includes a first base station 110, a second base station 120 and a mobile terminal 130. The first base station 110 communicates with the mobile terminal 130 under the first communication system. The second base station 120 communicates with the mobile terminal 130 under the second communication system.

It is supposed herein that a handover will be made from the first base station 110 to the second base station 120 while the mobile terminal 130 is communicating with the first base station 110. The first base station 110 includes a communication section 111. The communication section 111 communicates with the mobile terminal 130 using radio frames of the first communication system in the form of telephone call and data transmission. The communication section 111 transmits synchronization signals to the mobile terminal 130 under the first communication system.

The second base station 120 includes a communication section 121 and a transmitting section 122. The communication section 121 communicates with the mobile terminal 130 using radio frames of the second communication system in the form of telephone call and data transmission. The communication section 121 transmits synchronization signals to the mobile terminal 130 under the second communication system. The transmitting section 122 transmits synchronization signals to the mobile terminal 130 under the first communication system. The transmitting section 122 synchronizes the synchronization signals to be transmitted under the first communication system using the radio frames transmitted from the communication section 121.

The mobile terminal 130 includes an antenna 131, a first communication large scale integration (LSI) 132, a second communication LSI 133 and a control LSI 134. The first communication LSI 132 implements a communication process under the first communication system. The second communication LSI 133 implements a communication process under the second communication system. The first communication LSI 132 and the second communication LSI 133 share the antenna 131 for wireless communication.

For example, a path changeover switch is provided between the antenna 131 and the communication LSIs, i.e., the first communication LSI 132 and the second communication LSI 133. The path changeover switch is operated by, for example, the control LSI 134 to allow one of the first communication LSI 132 and the second communication LSI 133 to implement wireless communication with the antenna 131.

The first communication LSI 132 includes a first communication section 132a and a first receiving section 132b. The first communication section 132a communicates with the first base station 110 under the first communication system. The first receiving section 132b receives synchronization signals transmitted from the first base station 110 under the first communication system and synchronization signals transmitted from the second base station 120 under the first communication system. The first receiving section 132b outputs received synchronization signals to the control LSI 134.

The second communication LSI 133 includes a second communication section 133a and a second receiving section 133b. The second communication section 133a communicates with the second base station 120 under the second communication system. The second receiving section 133b receives radio frames transmitted from the second base station 120 under the second communication system. The second receiving section 133b receives symbols for measurement included in the radio frames on the basis of head positions of the radio frames notified from the control LSI 134. The second receiving section 133b outputs the received symbols for measurement to the control LSI 134.

The control LSI 134 includes a frame head detection section 134a and a handover processing section 134b. The frame head detection section 134a detects head positions of the radio frames transmitted from the second base station 120 under the second communication system on the basis of the synchronization signals transmitted from the second base station 120 under the first communication system and output from the first receiving section 132b. The frame head detection section 134a then notifies the detected head positions to the second communication LSI 133. Detection of the head positions by the frame head detection section 134a will be described later (see FIGS. 4 and 5).

The handover processing section 134b assesses quality of communication between the first base station 110 and the mobile terminal 130 on the basis of the synchronization signals (under the first communication system) transmitted from the first base station 110 and output from the first communication LSI 132. The handover processing section 134b assesses quality of communication between the second base station 120 and the mobile terminal 130 on the basis of the symbols for measurement (under the second communication system) transmitted from the second base station 120 and output from the first communication LSI 132.

The handover processing section 134b implements a handover process from the first base station 110 to the second base station 120 on the basis of the assessment result of communication quality. In particular, the handover processing section 134b stops communication with the first base station 110 under control of the first communication LSI 132 and then starts communication with the second base station 120 under control of the second communication LSI 133. The handover process under the control of the handover processing section 134b will be described later with reference to FIG. 2.

In the configuration of the mobile terminal 130 illustrated in FIG. 1, the first communication LSI 132, the second communication LSI 133 and the control LSI 134 are provided separately. However, functional sections of the first communication LSI 132, the second communication LSI 133 and the control LSI 134 may be implemented as an integrated LSI. Alternatively, the functional section of the control LSI 134 may be provided in the first communication LSI 132 or in the second communication LSI 133.

In the foregoing description, the mobile terminal 130 can be operated both under the first communication system and under the second communication system. However, the mobile terminal 130 may be operated in one of three or more communication systems. In that case, the mobile terminal 130 receives synchronization signals under a communication system in operation from the base station adapted for handover communication. The mobile terminal 130 detects head positions of radio frames on the basis of the received synchronization signals and assesses the communication quality in order to implement a handover process.

The transmitting section 122 of the second base station 120 may transmit synchronization signals under the first communication system at frequencies different from those of the synchronization signals transmitted from the first base station 110 under the first communication system. The first receiving section 132b of the mobile terminal 130 receives synchronization signals transmitted from the second base station 120 under the first communication system at frequencies different from those of the synchronization signals transmitted from the first base station 110 under the first communication system.

With this configuration, the first receiving section 132b of the mobile terminal 130 can receive synchronization signals from the second base station 120 in the same manner as in the reception of synchronization signals of different frequencies under the first communication system. In this manner, the synchronization signals from the second base station 120 can be received using an existing function and head positions of the radio frames transmitted from the second base station 120 can be detected on the basis of the received synchronization signals.

(Handover Process of Mobile Terminal)

Figure 2:
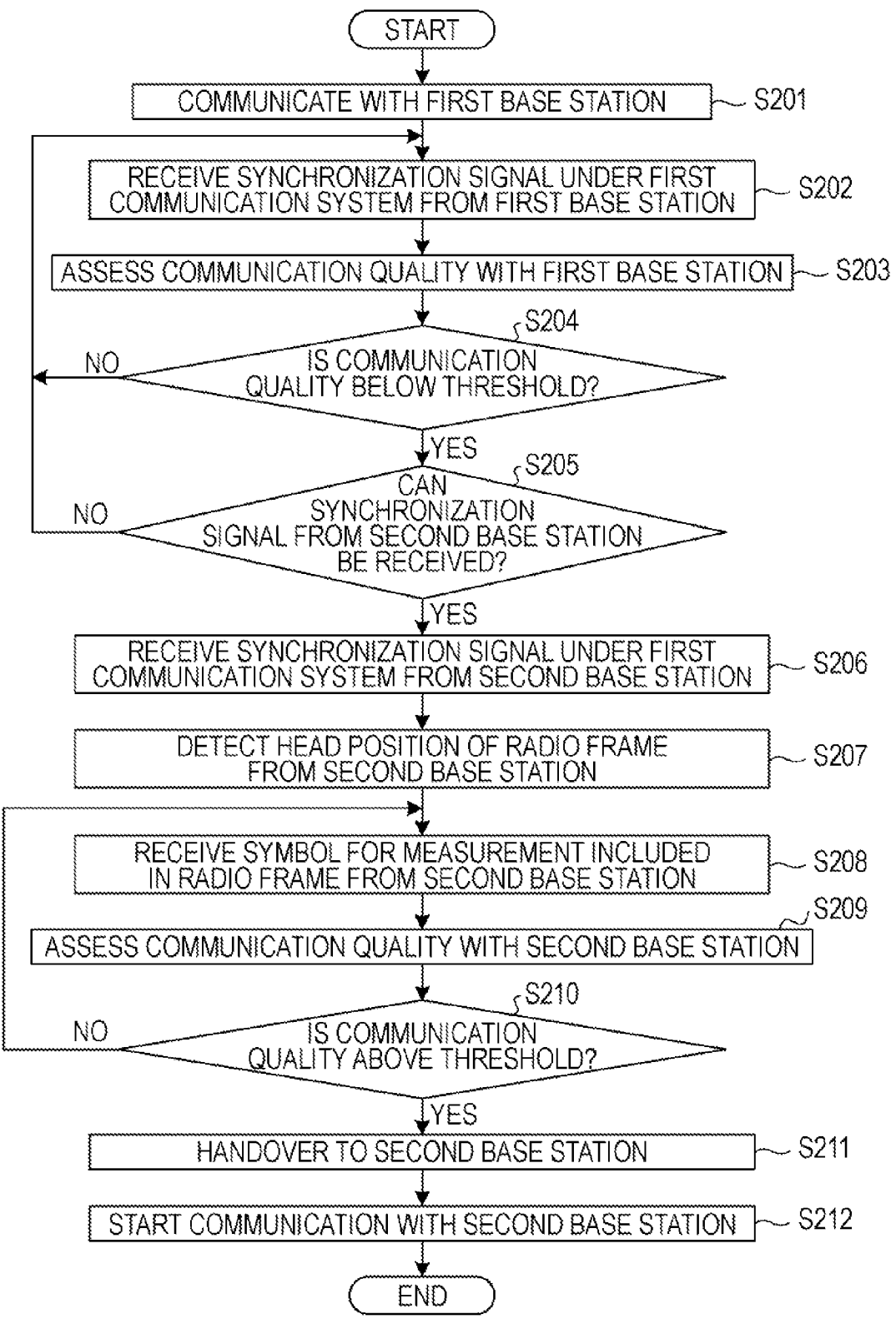
FIG. 2 is a flowchart of an exemplary handover process of the mobile terminal illustrated in FIG. 1.

FIG. 2 is a flowchart of an exemplary handover process of the mobile terminal 130 illustrated in FIG. 1. As illustrated in FIG. 2, the first communication section 132a is currently communicating with the first base station 110 under the first communication system (Step S201). When the first receiving section 132b receives synchronization signals from the first base station 110 under the first communication system (Step S202), the handover processing section 134b assesses quality of communication between the first receiving section 132b and the first base station 110 on the basis of the synchronization signals received in Step S202 (Step S203).

The handover processing section 134b determines whether the communication quality assessed in Step S203 is on or below a threshold (Step S204). When the communication quality is not on or below the threshold (Step S204: negative), the routine loops back to Step S202 for a continued process. When the communication quality is on or below the threshold (Step S204: affirmative), the handover processing section 134b determines whether synchronization signals can be received from the second base station 120 (Step S205).

When it is determined in Step S205 that the synchronization signals cannot be received from the second base station 120 (Step S205: negative), the routine loops back to Step S202 for a continued process. When it is determined that the synchronization signals can be received (Step S205: affirmative), the second receiving section 133b receives the synchronization signals from the second base station 120 under the first communication system (Step S206).

Next, the frame head detection section 134a detects head positions of the radio frames transmitted from the second base station 120 under the second communication system on the basis of the synchronization signals received in Step S206 (Step S207). The second receiving section 133b then receives symbols for measurement included in the radio frames transmitted from the second base station 120 on the basis of the head positions detected in Step S207 (Step S208).

Next, the handover processing section 134b assesses quality of communication between the second receiving section 133b and the second base station 120 on the basis of the symbols for measurement received in Step S208 (Step S209). The handover processing section 134b then determines whether the communication quality assessed in Step S209 is above a threshold (Step S210). When the assessed communication quality is not above the threshold (Step S210: negative), the routine loops back to Step S208 for a continued process.

When it is determined in Step S210 that the assessed communication quality is above the threshold (Step S210: affirmative), the handover processing section 134b implements a handover process from the first base station 110 to the second base station 120 (Step S211). The second communication section 133a then starts communication with the second base station 120 under the second communication system (Step S212) and terminates a series of the handover process.

Figure 3:
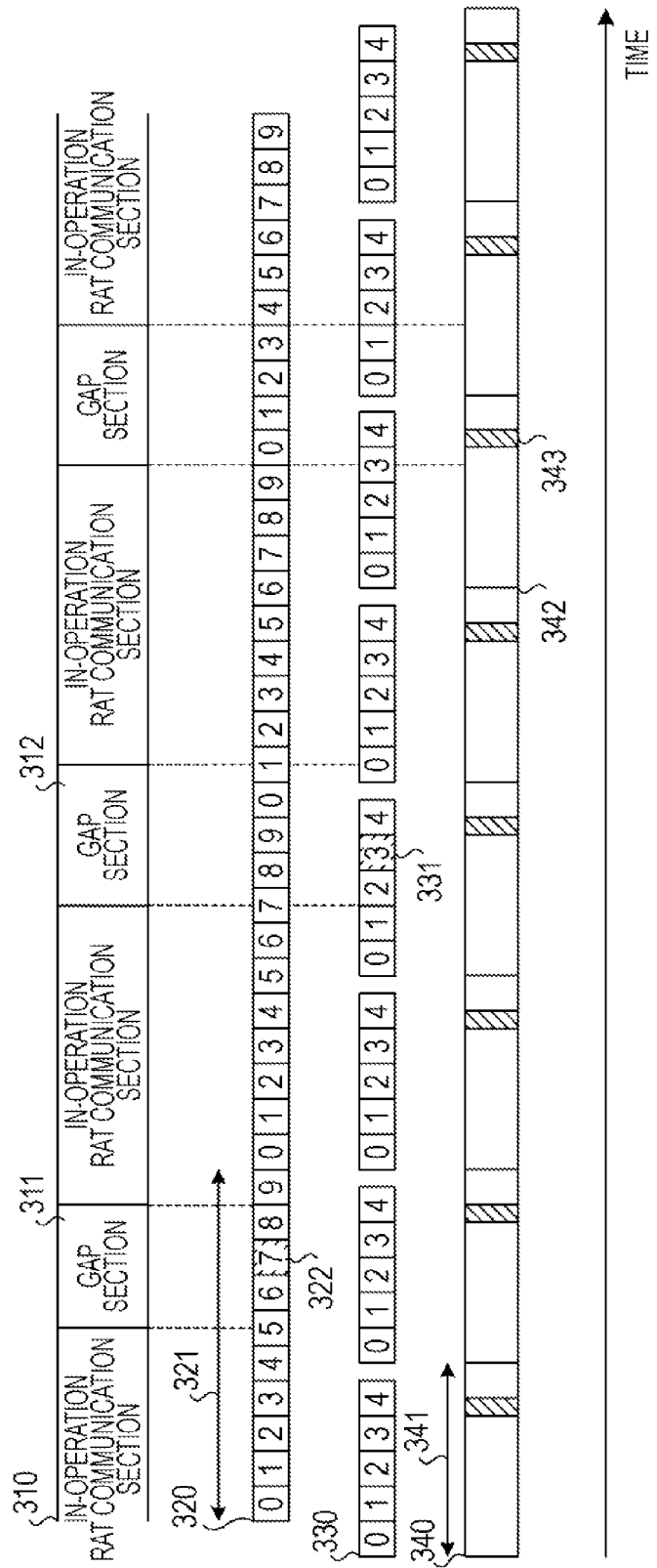
FIG. 3 is a timing chart of an exemplary operation of the mobile terminal illustrated in FIG. 1.

FIG. 3 is a timing chart of an exemplary operation of the mobile terminal illustrated in FIG. 1. In FIG. 3, the horizontal axis represents time. The communication status 310 represents, in the form of a timing chart, a status of communication between the mobile terminal 130 and the first base station 110 under the first communication system. The communication status 310 includes in-operation RAT communication sections and gap sections. The mobile terminal 130 communicates with the first base station 110 under the first communication system in the in-operation RAT communication sections and no communication is made between the mobile terminal 130 and the first base station 110 in the gap sections.

The synchronization signals 320 are transmitted from the first base station 110 under the first communication system. The frame 321 is one of the frames of the synchronization signals 320. Slots "0" to "9" are included in the frame 321. The first base station 110 repeatedly transmits the frame 321 as the synchronization signals 320 under the first communication system.

The mobile terminal 130 receives the synchronization signals 320 in the gap sections of the communication status 310. It is supposed herein that the mobile terminal 130 receives slot "7" denoted by the reference numeral 322 in the gap section 311 of the communication status 310. The mobile terminal 130 assesses quality of communication between the first base station 110 and the mobile terminal 130 on the basis of the received slot "7."

The synchronization signals 330 are transmitted from the second base station 120 under the first communication system. The radio frames 340 are transmitted from the second base station 120 under the second communication system. The frame 341 is one of the radio frames 340. The radio frames 340 include symbols for measurement at predetermined positions therein (see hatched sections in FIG. 3). The second base station 120 transmits the synchronization signals 330 in synchronization with the radio frames 340.

In particular, the second base station 120 transmits a frame as a synchronization signal in synchronization with the frame 341 of the radio frames 340. Each frame transmitted from the second base station 120 includes a number of slots that fall within the frame 341. Since five slots fall within the frame 341 here, each frame including slots "0" to "4" is transmitted as a synchronization signal in synchronization with the frame 341.

Since the synchronization signals 330 are transmitted under the first communication system, the first receiving section 132b of the mobile terminal 130 can receive the synchronization signals 330 accurately in the gap sections of the communication status 310. It is supposed herein that the first receiving section 132b of the mobile terminal 130 receives slot "3" of the synchronization signals 330 denoted by the reference numeral 331 in a gap section 312.

Since the synchronization signals 330 are in synchronization with the radio frames 340 under the second communication system, the frame head detection section 134a can detect one of the head positions of the radio frames 340 on the basis of slot "3" denoted by the reference numeral 331. It is supposed herein that the frame head detection section 134a detects the head position 342 of the synchronization signals 330 on the basis of slot "3."

In this manner, the second receiving section 133b can accurately receive a symbol for measurement 343 included in a radio frame with the head position 342 in the radio frames 340. It is supposed herein that a section defined between the head position 342 and the symbol for measurement 343 is determined in advance. With this configuration, the mobile terminal 130 can accurately assess quality of communication with the second base station 120 while communicating with the first base station 110.

As described above, in the configuration in which the antenna 131 is shared by the first and second communication systems, assessment of quality of communication under the second communication system can be made during communication under the first communication system. In this manner, a handover from the first base station 110 operating under the first communication system to the second base station 120 operating under the second communication system can be made accurately with a single antenna 131 shared by the first and second communication systems. Such a shared antenna can reduce the device size.

Figure 4:
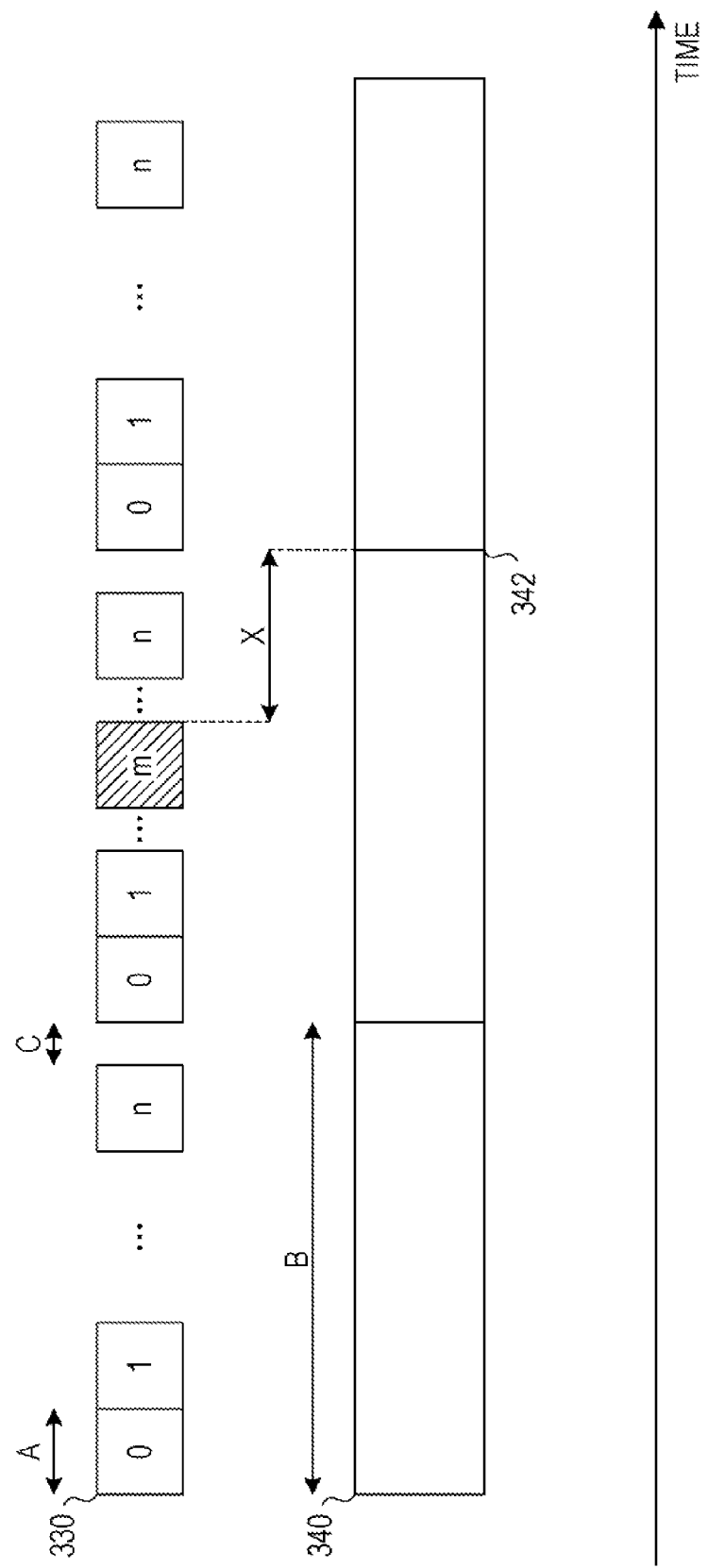
FIG. 4 illustrates detection of a head position of a radio frame.

FIG. 4 illustrates exemplary detection of a head position of a radio frame. In FIG. 4, the same components will be denoted by the same reference numerals as those illustrated in FIG. 3 and description thereof will be omitted. FIG. 4 illustrates a part of the synchronization signals 330 and the radio frames 340 illustrated in FIG. 3. Section "A" corresponds to one slot of the synchronization signals 330. Section "B" corresponds to one frame (corresponding to the frame 341 illustrated in FIG. 3) of the radio frames 340.

Sections "A" and "B" are determined in advance and are stored in a memory of the mobile terminal 130 and "n" is a positive integer obtained by adding 1 to the number of slots in the frame 341 of the radio frames 340 (quotient of B/A). Section "C" represents a length of a fraction (remainder of B/A) where section "B" is represented by (n+1) section "A."

It is supposed herein that the first receiving section 132b received slot "m" (the (m+1)th slot in the frame) of the synchronization signals 330. Let X denote a section defined between reception of slot "m" by the first receiving section 132b and the next head position of the radio frames 340, X is represented by the following equation: X=(n−m)×A+C. The frame head detection section 134a can detect the next head position of the radio frames 340 in this manner. For example, when n=4 and m=3 as illustrated in FIG. 3, the head position can be obtained by the following equation: X=(4−3)×A+C=A+C.

The frame head detection section 134a detects, as a head position in the radio frames 340, a point of time after a section X+B×N (N=0, 1, 2, . . . ) has elapsed from the reception of slot "m" by the first receiving section 132b. In the example illustrated in FIG. 3, the frame head detection section 134a detects, as the head position 342 in the radio frames 340, a point of time after a section X+B×1 has elapsed (i.e., the mobile terminal stands by for one frame) from the reception of slot "3" denoted by the reference numeral 331.

Figure 5:
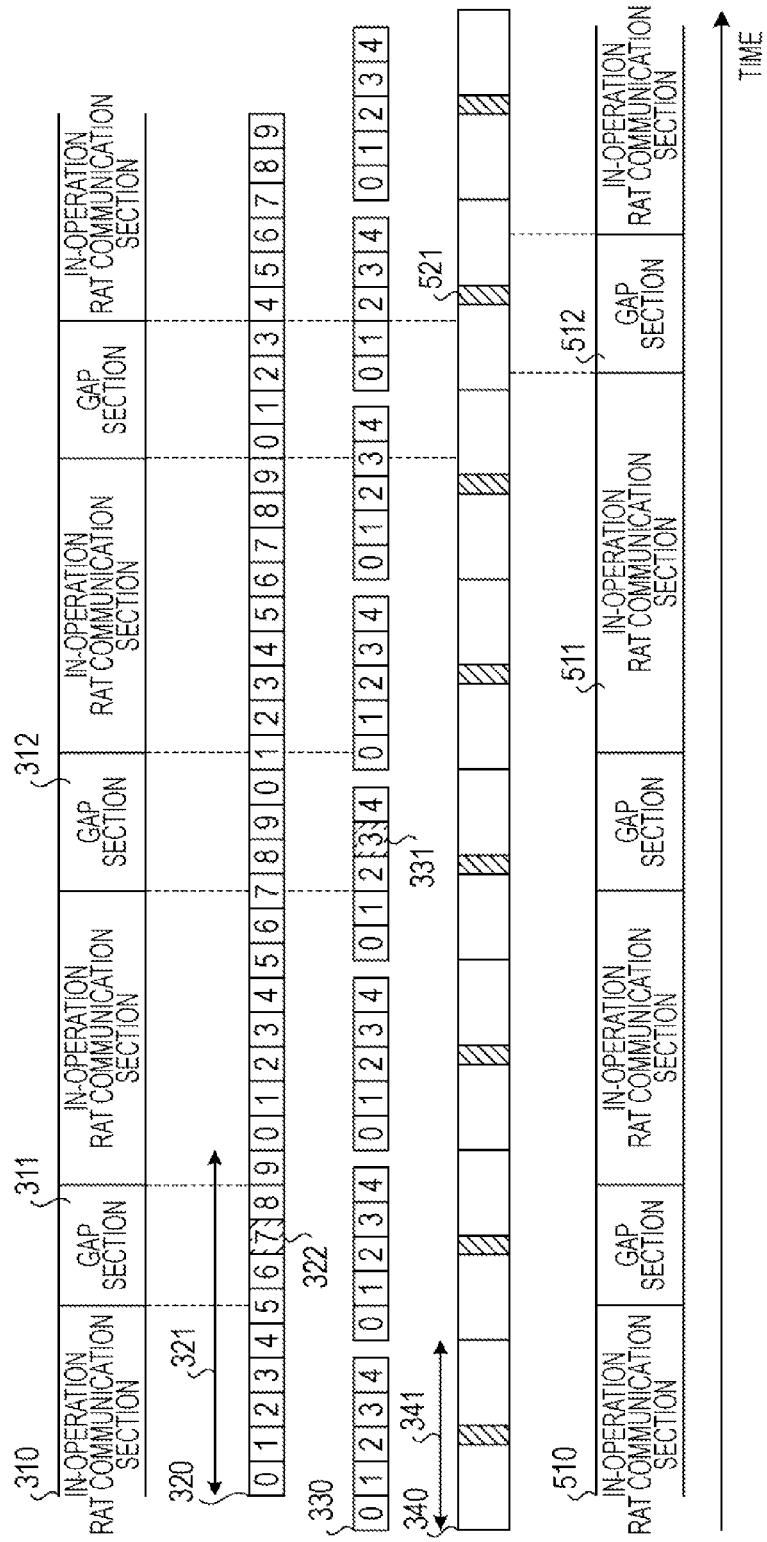
FIG. 5 is a timing chart illustrating control of gap sections.

FIG. 5 is a timing chart illustrates control in the gap section. In FIG. 5, the same components will be denoted by the same reference numerals as those illustrated in FIG. 3 and description thereof will be omitted. The symbol for measurement may be out of the gap sections shown in the communication status 310 in accordance with the position of the symbol for measurement in each frame of the radio frames 340.

In that case, the first communication section 132a of the mobile terminal 130 controls the gap sections so that the symbol for measurement included in the radio frames 340 falls within a gap section in the communication made between the first base station 110 and the mobile terminal 130. The gap sections are controlled through, for example, transmission of a requirement signal from the first communication section 132a to the first base station 110.

The communication status 510 shows a status of communication between the mobile terminal 130 and the first base station 110 after the gap sections are controlled by the first communication section 132a. The symbol for measurement 521 of the radio frames 340 is controlled to fall within a next gap section 512 in the communication status 510 by extending an in-operation RAT communication section denoted by the reference numeral 511.

In this manner, the first communication section 132a of the mobile terminal 130 controls the gap section of the communication between the mobile terminal 130 and the first base station 110 on the basis of the head positions of the radio frames 340 detected by the frame head detection section 134a. In particular, the first communication section 132a controls the gap sections so that a section of the symbol for measurement specified on the basis of the head position in the radio frames 340 detected by the frame head detection section 134a falls within the gap section.

(Modified Embodiment of Communication System)

FIG. 6 is a block diagram of a modified embodiment of the communication system illustrated in FIG. 1. In FIG. 6, the same components will be denoted by the same reference numerals as those illustrated in FIG. 1 and description thereof will be omitted. It is supposed herein that a handover will be made from the second base station 120 to the first base station 110 while the mobile terminal 130 is communicating with the second base station 120 under the second communication system.

The first base station 110 includes a communication section 111 and a transmitting section 612. The transmitting section 612 transmits synchronization signals to the mobile terminal 130 under the second communication system. The transmitting section 612 synchronizes the synchronization signals to be transmitted under the second communication system with the radio frames transmitted from the communication section 111. In this configuration, the transmitting section 122 (see FIG. 1) of the second base station 120 may be omitted.

The first receiving section 132b of the first communication LSI 132 receives radio frames transmitted from the first base station 110. The first communication section 132a receives a symbol for measurement included in the radio frames on the basis of head position of the radio frames notified from the control LSI 134. The first receiving section 132b outputs the received symbol for measurement to the control LSI 134.

The frame head detection section 134a detects head positions of the radio frames transmitted from the first base station 110 under the first communication system on the basis of the symbol for measurement under the second communication system transmitted from the first base station 110 and output from the first receiving section 132b. The frame head detection section 134a then notifies the detected head positions to the first communication LSI 132. The head positions are detected by the frame head detection section 134a in the similar manner to those described in FIGS. 4 and 5. Thus, description thereof will be omitted.

The handover processing section 134b implements a handover process from the second base station 120 to the first base station 110 on the basis of the assessment result of communication quality. In particular, the handover processing section 134b stops communication with the second base station 120 under control of the second communication LSI 133 and then starts communication with the first base station 110 under control of the first communication LSI 132.

The configuration of the communication system 100 illustrated in FIG. 1 and the configuration of the communication system 100 illustrated in FIG. 6 may be combined together. In this manner, the mobile terminal 130 can accurately make a handover both from the first base station 110 to the second base station 120 and from the second base station 120 to the first base station 110.

As described above, in the mobile terminal, the communication system and the communication method according to the present embodiment, the synchronization signals are transmitted from the second base station to the mobile terminal under the first communication system in synchronization with the radio frames of the second communication system. With this configuration, the head positions of the radio frames transmitted from the second base station under the second communication system can be detected and the symbol for measurement included in the radio frames can be received accurately.

Thus, in the configuration in which the antenna of the mobile terminal is shared by the first and second communication systems, quality of communication under the second communication system can be assessed while communication is made under the first communication system. In this manner, a handover from the first base station under the first communication system to the second base station under the second communication system can be made accurately with a single antenna shared by the first and second communication systems. Such a shared antenna can reduce the device size.

Even in a configuration in which no sufficient gap sections are provided in the radio frames of the first communication system, the head positions of the radio frames of the second communication system transmitted from the second base station can be detected accurately. Thus, a handover can be made accurately from the first base station under the first communication system to the second base station under the second communication system while providing sufficient sections for communication under the first communication system.

Since the head positions of the radio frames of the second communication system transmitted from the second base station are detected on the basis of the synchronization signals under the first communication system in operation, the head positions of the radio frames can be detected rapidly. It is therefore possible to rapidly determine whether a handover should be made from the first base station to the second base station. Thus, when the mobile station approaches the second base station apart from the first base station, for example, a handover from the first base station to the second base station can be made rapidly.

It is also possible to accurately control the symbol for measurement of the radio frames transmitted from the second base station to fall within the gap sections by controlling the gap sections during communication between the first base station and the mobile terminal on the basis of the detected head positions. Thus, as compared with a configuration in which the mobile station stands by until the symbol for measurement of the radio frames transmitted from the second base station falls within the gap sections, the symbol for measurement can be received rapidly. Thus, a rapid handover can be made from the first base station to the second base station.

All examples and conditional language recited herein are intended for pedagogical purposes to aid the reader in understanding the invention and the concepts contributed by the inventor to furthering the art, and are to be construed as being without limitation to such specifically recited examples and condition, nor does the organization of such examples in the specification relate to a showing of superiority and inferiority of the invention. Although the embodiment of the present inventions have been described in detail, it should be understood that the various changes, substitutions, and alternations could be made hereto without departing from the spirit and scope of the invention.

What is claimed is:

1. A communication system comprising:
a first base station configured to perform communication using a first communication protocol which uses first radio frames and first synchronization signals synchronizing the first radio frames;
a second base station configured to perform communication using a second communication protocol which uses second radio frames; and
a mobile terminal configured to
perform communication on the basis of the first communication protocol and the second communication protocol,
receive, while communicating with the first base station, second synchronization signals from the second base station, the second synchronization signals being based on the first synchronization signals and synchronizing the second radio frames, and
estimate transmitting timing of the second radio frames including symbols on the basis of the received second synchronization signals, wherein
each of the first synchronization signals has a length corresponding to each of the first radio frames, and
each of the second synchronization signals is a signal obtained by adjusting the length of each of the first synchronization signals to become a length corresponding to each of the second radio frames.

2. The communication system according to claim 1, wherein the mobile terminal is configured to control gap sections in the first radio frames based on the transmitting timing, and detect the symbols in the second radio frames received from the second base station in the gap sections.

3. The communication system according to claim 1, wherein the second synchronization signals have frequencies which are different from frequencies of first synchronization signals.

4. The communication system according to claim 1, wherein the mobile terminal comprises a first communication circuit which communicates with the first base station using the first communication protocol, and a second communication circuit which communicates with the second base station using the second communication protocol.

5. The communication system according to claim 4, wherein the mobile terminal comprises an antenna which is shared by the first communication circuit and the second communication circuit.

6. A mobile terminal comprising:
a receiver configured to receive, while communicating with a first base station, second synchronization signals from a second base station, the first base station performing communication using a first communication protocol which uses first radio frames and first synchronization signals synchronizing the first radio frames, the second base station performing communication using a second communication protocol which uses second radio frames, and the second synchronization signals being based on the first synchronization signals and synchronizing the second radio frames; and a processor configured to estimate transmitting timing of the second radio frames including symbols on the basis of the received second synchronization signals, wherein each of the first synchronization signals has a length corresponding to each of the first radio frames, and each of the second synchronization signals is a signal obtained by adjusting the length of each of the first synchronization signals to become a length corresponding to each of the second radio frames.

7. A communication method comprising:

receiving, while communicating with a first base station, second synchronization signals from a second base station, the first base station performing communication using a first communication protocol which uses first radio frames and first synchronization signals synchronizing the first radio frames, the second base station performing communication using a second communication protocol which uses second radio frames, and the second synchronization signals being based on the first synchronization signals and synchronizing the second radio frames; and estimating transmitting timing of the second radio frames including symbols on the basis of the received second synchronization signals, wherein each of the first synchronization signals has a length corresponding to each of the first radio frames, and each of the second synchronization signals is a signal obtained by adjusting the length of each of the first synchronization signals to become a length corresponding to each of the second radio frames.

8. A base station comprising:

a processor configured to perform communication with a mobile terminal by using a second communication protocol which uses second radio frames; and a transmitter configured to transmit second synchronization signals to the mobile terminal which communicates with another base station by using a first communication protocol which uses first radio frames and first synchronization signals synchronizing the first radio frames, the second synchronization signals being based on the first synchronization signals and synchronizing the second radio frames, wherein each of the first synchronization signals has a length corresponding to each of the first radio frames, and each of the second synchronization signals is a signal obtained by adjusting the length of each of the first synchronization signals to become a length corresponding to each of the second radio frames.

9. The communication system according to claim 1, wherein the mobile terminal is configured to measure a receiving signal strength of the symbol transmitted from the second base station based on the estimated transmitting timing, and control a handover based on the measurement result of the receiving signal strength of the symbol.

10. The mobile terminal according to claim 6, wherein the processor is configured to:

measure a receiving signal strength of the symbol transmitted from the second base station based on the estimated transmitting timing, and control a handover from the first base station to the second base station based on the measurement result of the receiving signal strength of the symbol.

11. The communication method according to claim 7, further comprising:

measuring a receiving signal strength of the symbol transmitted from the second base station on the basis of the estimated transmitting timing; and controlling a handover from the first base station to the second base station based on the measurement result of the receiving signal strength of the symbol.

* * * * *